A. W. SMITH.
EVAPORATIVE COOLER.
APPLICATION FILED MAR. 28, 1916.
1,221,916.
Patented Apr. 10, 1917.
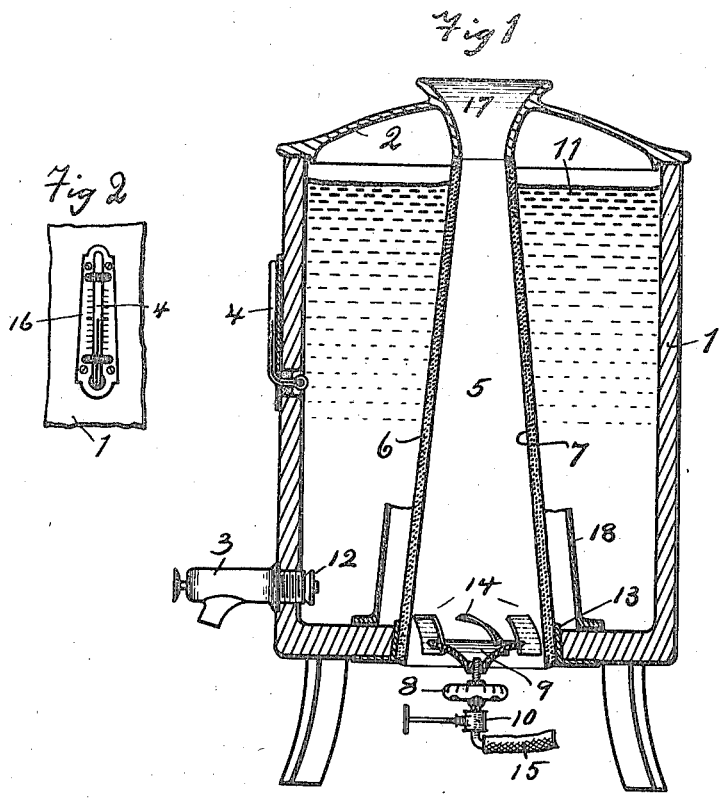
Witnesses:
B. F. Hudlow
R. Boyd
Inventor:
Albert W. Smith

UNITED STATES PATENT OFFICE.

ALBERT W. SMITH, OF WASHINGTON, DISTRICT OF COLUMBIA.

EVAPORATIVE COOLER.

1,221,916.     Specification of Letters Patent.     Patented Apr. 10, 1917.

Application filed March 28, 1916. Serial No. 87,339.

*To all whom it may concern:*

Be it known that I, ALBERT W. SMITH, a citizen of the United States, residing at Washington, in the District of Columbia, have invented certain new and useful Improvements in Evaporative Coolers, and the following is a specification thereof.

My invention relates to an evaporative water cooler of the porous wall or seepage type, in which the seepage pores act to increase the aeration of the drinking water; the heat in the drinking water acts to vaporize the seepage; and a current of superheated air acts to absorb and remove the resulting vapor; thus obtaining a highly palatable, cooling and refreshing drinking water.

Two forms of the evaporative cooler have heretofore been used: 1st, the "olla" or open type, as used in arid climates, such as that of Mexico; and, 2d, the air jacketed type, as used in less arid climates. The olla is simply placed in the open air and shaded, the atmospheric air being relied upon to absorb and remove the vapor therefrom; so long as the air is dry and warm, and circulates freely around the cooler, its action is satisfactory, but during calm, cool, or damp weather it becomes inoperative.

With the air jacketed type a power driven air fan, a chimney or other hot air flue, acts to circulate atmospheric air through the jacket; the advantage of this type over the olla is that it remains operative during a calm if the air is dry and warm, but cool or damp weather also renders it inoperative.

It is thus seen that the generally variable temperature, humidity and mobility of the atmosphere acts to limit the use of the evaporative cooler as heretofore constructed and operated to climates that are permanently dry and warm.

The vapor absorbing capacity of the air can, however, be greatly increased by superheating; thus air at 150° F. absorbs about 10 times as much vapor as at the summer temperature of 85° F.

The object of my invention, therefore, is: 1st, to apply the evaporative cooling method to the well known form of tank cooler now in general use; and, 2d, to employ superheated air as the vapor absorbent and carrier therein; thus obtaining a rapid and perfectly controllable cooling action, and adapting the cooler for use in any climate, regardless of atmospheric conditions.

To these ends my invention consists; 1st, in providing the cooler with a vaporizing chamber; 2d, in providing the cooler with air superheating means; and 3d, in providing the cooler with air distributing means.

The drawings show my invention as applied to a cooler of the well known tank form; presenting a sectional view thereof in Figure 1 and a detail view in Fig. 2.

The cooler consists of three groups of elements: 1st, the water tank 1, with a cover 2, a faucet 3, and a thermometer 4; 2d, the conical vaporizing chamber 5, formed by the seepage tube 6, with an evaporating surface 7; and, 3d, the heating gas burner 8, with an air distributer 9, and a controlling valve 10.

The tank 1 is formed of indurated fiber or other similar material, to insulate the drinking water 11 against the surrounding higher temperature. The cover 2 is formed of aluminum so as to be light and easily handled. The faucet 3 is formed of aluminum and is designed to prevent the staling of water therein. To this end its valve 12 is placed inside the cooler, thus insuring a complete drainage of the faucet after use. The thermometer 4 is mounted on the wall of the tank 1 with its bulb in contact with the water 11, and acts to indicate the temperature thereof. The seepage tube 6 is formed of porous cement, and has cemented thereto an iron ring 13, by means of which it is secured to the floor of the tank 1, thus forming the interior conical porous walled vaporizing chamber 5 for the cooler. The seepage rate through the tube 6 must be such as to supply to the evaporating surface 7 an amount of moisture, the vaporization of which will produce the necessary cooling effect on the drinking water 11; too great a porosity in the seepage tube means a loss of seepage water, while too little porosity means a reduced cooling capacity of the cooler. Heretofore evaporative coolers have been formed of porous earthenware, and it has been impossible to accurately control their porosity; the use of porous cement for the seepage tube of the cooler is, therefore, an important feature of my invention, as by varying the size of the grain of the cement the porosity and seepage rate thereof can be predetermined with great accuracy. By "porous cement" is meant a cement composed of relatively large and equal sized grains; ordinary cement is but slightly porous, due to its composition of a mixture of fine and coarse grains, and to the fact that in setting the fine grains fill the interstices between the coarse grains. The air distributer 9 is formed of a cup-shaped iron casting, to which are welded deflecting vanes 14, which are fastened to the tube 6 by cementing their ends thereto, thus securing it firmly in place. The burner 8 is of the type used in gas heating appliances and is secured to the distributer 9, its controlling valve 10 is of the needle type, to enable a close adjustment of the heating flame, a flexible pipe 15 connecting with a gas supply source serves to furnish gas to the burner 8. In Fig. 2 is shown a front view of the thermometer 4, the reading scale 16 of which is formed of aluminum, and is attached to the tank 1 by means of small screws.

The operation of the cooler is as follows: The tank 1 is filled from any suitable source with pure clean water 11, which may be supposed to be at the room temperature of about 70° F. Water then slowly seeps through the wall pores of the tube 6 and moistens the evaporating surface 7, but as the normal air pressure is acting thereon but little vaporization of the seepage therefrom can take place; the gas is then turned on by means of the valve 10, and the burner 8 lighted, thus producing a heated and expanding air column, and causing it to rise upward into the vaporizing chamber 5. When air is expanded by heating there is produced in it a condition of partial vacuum, the degree of vacuum depending upon the temperature of the air, and increasing therewith; the column of heated air in the chamber 5 is thus in effect a partial vacuum acting on the evaporating surface 7, and its effect is to enable the heat in the drinking water 11 to vaporize the seepage from the surface 7, thus lowering the temperature of the water 11 by the withdrawal of heat therefrom; as fast as the vapor is formed it is absorbed by the heated air and is finally carried away thereby when it escapes from the air vent 17.

As the air enters the chamber 5 through the distributer 9 its vanes 14 impart thereto a circular motion. It then continues upward in a helical path in contact with the surface 7, being forced into close contact therewith by its whirling and centrifugal action. The seepage tube 6 is made tapering toward the top to retard the exit of the heated air therefrom until fully loaded with vapor, and its action is to accelerate the whirling motion imparted to the air by the vanes 14, and thus to delay or retard its exit from the chamber 5 until fully charged with vapor, thus insuring an efficient and economical operation of the cooler.

The retarding action of the tapered tube 6 on the heated air is similar to that of a funnel on a liquid being poured through it; or to that of a wash basin with a drain plug in its bottom, as is well known, after the plug is pulled the water assumes an eddying motion, which greatly retards its drainage from the basin; for the best effect the air vent 17 should be as small and the taper of the seepage tube 6 should be as blunt as permissible, the heated air will then receive the maximum of retardation and will be kept closely in contact with the surface 7, and will finally escape from the air vent 17 fully loaded with vapor. In a straight seepage tube the air would rush up through its center away from the surface 7, and would escape without absorbing a full charge of vapor, and a cooler so operated would be very inefficient; it is thus seen that the tapered seepage tube 6 forms an important feature of my invention.

Water is best for drinking at temperatures between 45° and 55° F.; at higher temperatures it is flat and insipid to the taste, and at lower temperatures it acts to chill the stomach; the reading scale 16, Fig. 2, of the thermometer 4 is, therefore, marked for a mean temperature in the water 11 of 50° F., with an allowable variation up or down of 5°.

The cooling action on the water 11 is as follows: The water in contact with the tube 6 is the first to be cooled, thus slightly increasing its specific gravity, and causing it to sink to the bottom of the cooler, warmer water constantly taking the place of the cooled water until the level of the cooled water reaches the bulb of the thermometer 4, and indicates the temperature desired by the user between the limits above stated, the burner 8 can then be turned down so that it will just maintain the desired temperature. The heating capacity of the burner 8 must be just sufficient to absorb all of the seepage when the valve 10 is fully opened; if its heating capacity is greater than this the surface 7 will become dried, and the water 11 will then be heated instead of cooled; when the burner 8 is working at a reduced rate all of the seepage will not be vaporized and absorbed, and there will then be a slight water drip from the bottom of the tube 6 which will be received by a suitable drip pan not shown in the drawing. To insure an economical working of the cooler the tank 1 must be kept at least ⅔ full of water, otherwise the wetted surface 7 will be too greatly reduced for the best results. To keep the water 11 cool over night it is not necessary to keep the burner 8 lighted. As already stated, the cool water remains at the bottom; therefore, when the burner 8 is turned off and heat slowly enters the cooler, the water in contact with the walls of tank 1 is warmed first, and automatically rises to the top, and if the tank wall is of suitable thickness the water at the bottom of the tank will remain cool over night, or for a much longer period. The aerating action of the cooler on the water 11 is as follows: Air molecules in water occupy the interstices between the water molecules, and can, therefore, be easily separated therefrom by the pores in the seepage wall 6, which acts like a filter to retain the air of the seepage water in the cooler, thus tending constantly to increase the aeration of the drinking water 11, and keeping the same at all times fully aerated; this feature of the cooler is highly important, as the sweet and agreeable taste of good drinking water is due to its aeration, without which water is flat and insipid at any temperature.

The vapor absorbing capacity of air increases very rapidly with increasing temperature, and becomes infinite at the boiling point of water; the chamber 5 can, therefore, be quite small when air heated to or above 212° F. is employed.

In coolers for home and office use, where the attendance is liable to be more or less unskilled, I prefer to employ air at the temperature of about 150° F.; the volume of air then required will be such that a medium sized chamber 5 can be used, with a good whirling and retarding effect of the air, and an economical operation of the cooler.

For use in hotels, restaurants and clubs, where rapid cooling of various beverages is required, the cooler can be operated with air at high temperature, thus obtaining a very rapid cooling action, and enabling the rapid chilling of milk, tea, cider, buttermilk, etc., which are placed into the cooler and chilled to the temperature required, after which they are drawn off and placed into vacuum walled containers, from which they are dispensed as needed, thus enabling the use of a single cooler for chilling a variety of beverages.

When the cooler is used for cooling beverages other than water, its containing space is divided by a circular partition wall 18 running from the floor to the top of the tank 1. The beverage to be cooled is then placed in the outer or faucet compartment, while the center compartment is filled with water for seepage, and for conducting the heat from the beverage to be cooled. For use in factories, schools, etc., the tank 1 can be closed water-tight at the top and connected by piping with the water supply, the tube 6 is then made less porous because of the increased pressure acting thereon, and its seepage rate can then be controlled by means of a suitable valve in the water supply pipe. For large coolers well known thermostatic controlling means can be employed to automatically keep the drinking water 11 constantly at the temperature desired.

The advantages of my invention over existing forms of evaporative and other coolers are: 1st, it provides at all times and in any climate a moderately cooled, fully aerated and perfectly sanitary drinking water, equal in all respects to the best natural spring water; 2d, the cooler can be used indoors, thus serving to humidify the air of the rooms, and adding greatly to their sanitation and the health and comfort of the occupants; 3d, the cost of cooling the drinking water is lowered, and the unpleasant task of handling and washing the ice is eliminated thereby; and, 4th, the simplicity of the cooler enables a substantial and low priced construction thereof, thus placing it within the reach of all, while its reliability in operation adapts it for universal use in all climates.

My invention can be modified in many ways. Thus instead of the single large tube 6 a plurality of smaller tubes can be used. Porous metal or earthenware can be substituted for porous cement in the tube 6. Instead of heating the air at the cooler, it can be heated in a separate heating apparatus, and then piped to the cooler. In place of the gas burner 8, any well known type of electric heater can be used. An oil or alcohol burner can also be used to replace the gas burner 8. Other means of whirling and retarding the heated air can also be employed. The method of evaporative cooling by means of superheated air can also be applied to other uses than the cooling of drinking water, such as the cooling of provisions, the cooling of beer and any uses for which ice has heretofore been employed.

Having now fully described my invention and its operation, and pointed out some of its more obvious modifications, I desire to state that the same is not limited to any particular construction, use of materials or arrangement and relation of parts, as all of these can be modified in many ways without affecting the essential nature or spirit of the invention.

The term "superheated air," as used herein, refers to air heated above the temperature of the atmospheric air surrounding the cooler.

What I claim as my invention is:

1. In an evaporative cooler, the combination with a water tank, of a moist walled vaporizing chamber, and means for supplying a current of superheated air to said chamber, said superheated air acting to absorb the vapor formed on the walls of said chamber.

2. In an evaporative cooler, the combination with a water tank, of a moist walled vaporizing chamber, and air heating means at the bottom of said chamber for supplying a current of superheated air thereto, said superheated air acting to absorb the vapor formed on the walls of said chamber.

3. In an evaporative cooler, the combination with a water tank, of a moist walled vaporizing chamber, and stationary means for superheating and whirling the air as it enters said chamber, and also means for progressively accelerating the whirling motion of the air during its passage through said chamber, and thus retarding its outflow therefrom until fully charged with vapor.

4. In an evaporative cooler, the combination with a water tank, of a moist walled vaporizing chamber, air heating means at the bottom of said chamber, and air whirling means also at the bottom thereof, said chamber being conical in form and acting to progressively accelerate the whirling motion of the air during its passage through said chamber, and thus to retard its outflow therefrom until fully charged with vapor.

5. In an evaporative cooler, the combination with a water tank, of a moist walled vaporizing chamber, an air heating device at the bottom of said chamber, and an air distributer with air rotating vanes also at the bottom thereof, said chamber being conical in form and acting to progressively accelerate the whirling motion of the air during its passage through said chamber, and thus to retard its outflow therefrom until fully charged with vapor.

ALBERT W. SMITH.

Witnesses:
B. F. HUDLOW,
R. BOYD.